(12) United States Patent
Chou

(10) Patent No.: US 10,678,895 B2
(45) Date of Patent: Jun. 9, 2020

(54) DATA INPUT METHOD, AND ELECTRONIC DEVICE AND SYSTEM FOR IMPLEMENTING THE DATA INPUT METHOD

(71) Applicant: Hung-Chien Chou, Taichung (TW)

(72) Inventor: Hung-Chien Chou, Taichung (TW)

( * ) Notice: Subject to any disclaimer, the term of this patent is extended or adjusted under 35 U.S.C. 154(b) by 184 days.

(21) Appl. No.: 15/796,466

(22) Filed: Oct. 27, 2017

(65) Prior Publication Data

US 2018/0196929 A1   Jul. 12, 2018

(30) Foreign Application Priority Data

Jan. 6, 2017   (TW) .............................. 106100433 A

(51) Int. Cl.
| | |
|---|---|
| *G06F 21/31* | (2013.01) |
| *G06F 3/0489* | (2013.01) |
| *G06F 3/0488* | (2013.01) |
| *G06F 21/62* | (2013.01) |
| *G06F 21/83* | (2013.01) |
| *G06F 21/36* | (2013.01) |

(52) U.S. Cl.
CPC ............ *G06F 21/31* (2013.01); *G06F 3/0489* (2013.01); *G06F 3/04886* (2013.01); *G06F 21/36* (2013.01); *G06F 21/6209* (2013.01); *G06F 21/83* (2013.01)

(58) Field of Classification Search
CPC .......... G06F 21/31; G06F 21/36; G06F 21/83; G06F 21/6209; G06F 3/04886; G06F 3/0489
See application file for complete search history.

(56) References Cited

U.S. PATENT DOCUMENTS

| | | | | |
|---|---|---|---|---|
| 7,263,662 B1* | 8/2007 | Ballard | .................... | G06F 3/023 707/999.102 |
| 7,797,644 B1* | 9/2010 | Bhojan | ................. | G06F 3/0489 715/816 |
| 8,549,316 B2* | 10/2013 | Lu | .......................... | H04L 9/3226 398/106 |
| 8,977,966 B1* | 3/2015 | Saurav | ....................... | G06F 3/00 345/172 |
| 9,262,607 B1* | 2/2016 | Freund | ..................... | G06F 21/31 |
| 10,244,111 B1* | 3/2019 | Nguyen | ............... | H04M 3/4936 |
| 2003/0067446 A1* | 4/2003 | Ono | ......................... | G06F 3/0489 345/172 |
| 2004/0237108 A1* | 11/2004 | Drazin | ................ | H04N 5/44543 725/56 |
| 2006/0117271 A1* | 6/2006 | Keim | ..................... | G06F 3/0489 715/789 |

(Continued)

*Primary Examiner* — J. Brant Murphy
(74) *Attorney, Agent, or Firm* — Womble Bond Dickinson (US) LLP

(57) ABSTRACT

A data input method is implemented by an electronic device that includes a storage component, a display device and a processor. The storage component stores an application to be executed by the processor, in response to user-input selection of the application, to implement the data input method for entering data in an input field displayed on the display device. The data input method includes controlling the display device to display at least one hotkey that is associated with pre-stored data, and in response to user-input interaction associated with the at least one hotkey, entering the pre-stored data in the input field.

15 Claims, 12 Drawing Sheets

(56) References Cited

U.S. PATENT DOCUMENTS

| | | | |
|---|---|---|---|
| 2007/0013672 A1* | 1/2007 | Shim | G06F 3/04886 345/173 |
| 2008/0072155 A1* | 3/2008 | Detweiler | G06F 3/0489 715/729 |
| 2008/0307236 A1* | 12/2008 | Lu | H04L 9/3226 713/184 |
| 2009/0106558 A1* | 4/2009 | Delgrosso | G06F 21/32 713/184 |
| 2011/0083074 A1* | 4/2011 | Jellison, Jr. | G06F 3/0481 715/716 |
| 2014/0215378 A1* | 7/2014 | Braytenbaum | G06F 3/0481 715/780 |
| 2016/0171486 A1* | 6/2016 | Wagner | G06Q 20/12 705/39 |
| 2017/0180360 A1* | 6/2017 | Kuttipalakkal | H04L 63/0861 |

* cited by examiner

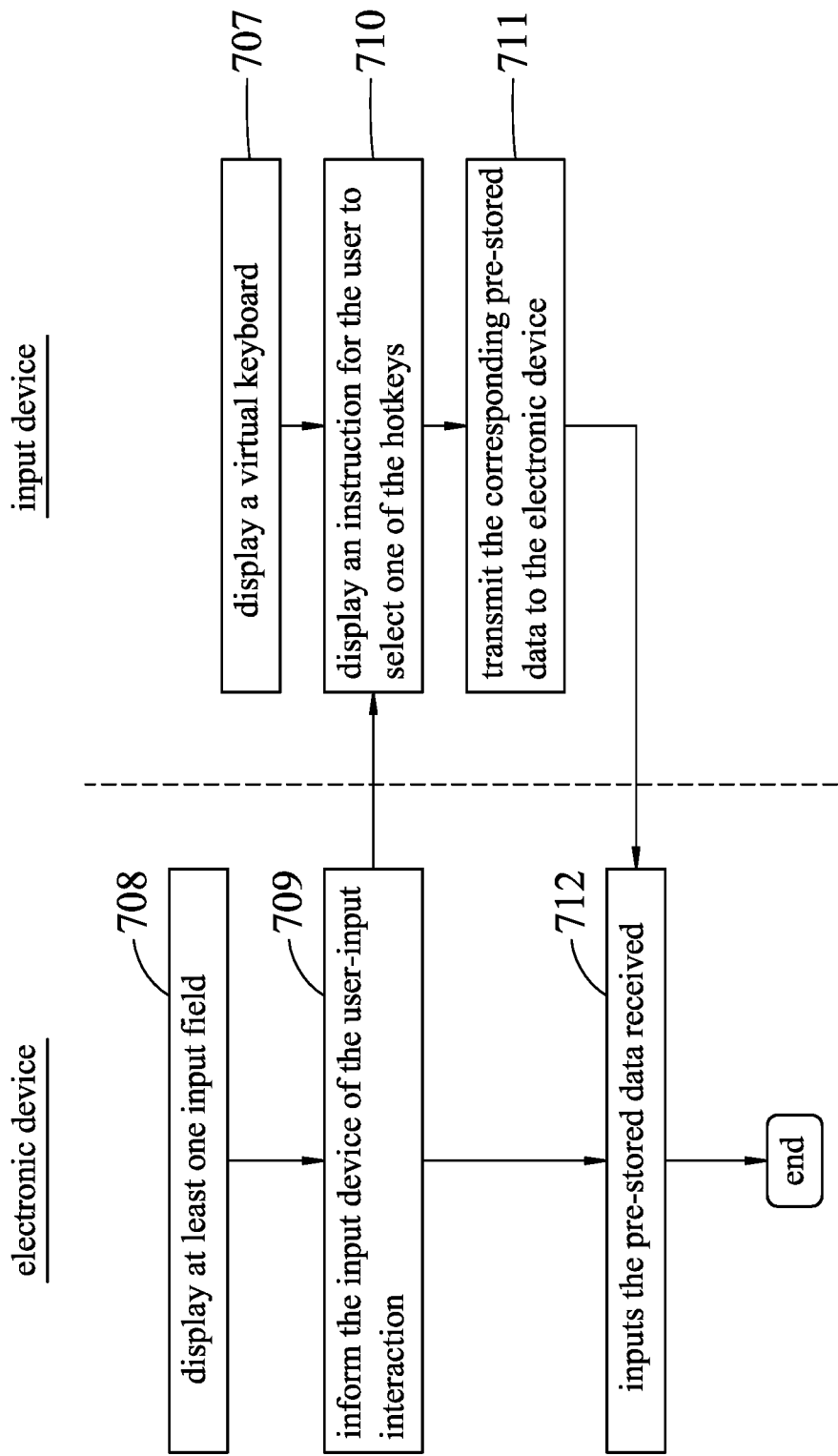

DATA INPUT METHOD, AND ELECTRONIC DEVICE AND SYSTEM FOR IMPLEMENTING THE DATA INPUT METHOD

CROSS-REFERENCE TO RELATED APPLICATION

This application claims priority of Taiwanese Patent Application No. 106100433, filed on Jan. 6, 2017.

FIELD

The disclosure relates to a data input method, and more particularly to a data input method implemented using a virtual keyboard.

BACKGROUND

In accessing services using an electronic device (e.g., a personal computer, a mobile device, etc.), it is typically required for a user of the electronic device to provide a set of username/password pair and/or additional information that can verify an identity of the user. For example, the set of username/password or the additional information may be required when the user intends to execute an operating system (OS) of the electronic device or an application program or to use an online service provided by a website that is only available to registered users.

The set of username/password is typically composed of a string of characters and/or numbers (e.g., several characters followed by several numbers). Input of the set of username/password may be done by the user using an input module such as a physical keyboard or a touch screen displaying a virtual keyboard thereon.

Due to varying security policies of the services, many different sets of username and password may need to be created by the same user to access the different services. Further, requirement for a format of a password or a username may be increasingly complicated nowadays for preventing unauthorized and malicious access. For example, a specific cloud drive service may require a valid password to include at least one upper case letter, at least one lower case letter, and at least one number in order to reduce the risk of the password being cracked.

SUMMARY

One object of the disclosure is to provide a data input method for inputting pre-stored data such as a set of username and password in a more convenient manner.

According to one embodiment of the disclosure, the data input method may be implemented by an electronic device that includes a storage component, a display device and a processor.

The storage component stores a data input application to be executed by the processor, in response to user-input selection of the data input application, to implement the data input method for entering data in an input field displayed on the display device. The data input method includes:

controlling, by the processor, the display device to display an authentication instruction instructing a user to input authentication data associated with an identity of the user;

in response to receipt of the authentication data inputted via an input module of the electronic device, comparing, by the processor, the authentication data with user data pre-stored in the storage component;

when it is determined that the authentication data is identical with the user data, controlling, by the processor, the display device to display at least one hotkey that is associated with pre-stored data; and in response to user-input interaction associated with the at least one hotkey, entering, by the processor, the pre-stored data in the input field.

According to another embodiment of the disclosure, a data input method may be implemented by an electronic device communicating with an input device that stores pre-stored data therein. The electronic device includes a storage component, a display device, a processor and a communication component. The storage component stores a data input application to be executed by the processor, in response to user-input selection of the data input application, to implement the data input application for entering data in an input field displayed on the display device, to implement the data input method, the data input method includes:

displaying, by the input device, a hotkey list including at least one hotkey that is associated with the pre-stored data;

in response to a user-input interaction associated with the at least one hotkey, transmitting, by the input device, the pre-stored data to the communication component; and in response to receipt of the pre-stored data from the input device, entering, by the processor, the pre-stored data in the input field.

According to yet embodiment of the disclosure, a data input method may be implemented by an electronic device communicating with an authentication device, the electronic device including a storage component, an input module, a display device, a processor and a communication component, the storage component storing a data input application to be executed by the processor, in response to user-input selection of the data input application, to implement the data input method for entering data in an input field displayed on the display device, the data input method comprising:

controlling, by the processor, the display device to display an authentication instruction instructing a user to input authentication data associated with an identity of the user;

in response to receipt of the authentication data inputted via the input module, comparing, by the processor, the authentication data with user data pre-stored in the storage component;

when it is determined that the authentication data is identical with the user data, controlling, by the processor, the communication component to transmit an authorization request to the authentication device;

in response to an authorization from the authentication device, controlling, by the processor, the display device to display a hotkey list including at least one hotkey that is associated with pre-stored data; and in response to user-input interaction associated with the at least one hotkey, entering, by the processor, the pre-stored data in the input field.

Another object of the disclosure is to provide a data input system for implementing the above-mentioned data input method.

According to one embodiment of the disclosure, a data input system includes an electronic device and an input device.

The electronic device includes a storage component, a display device and a processor. The storage component storing a data input application to be executed by the processor.

The input device is coupled to the electronic device and stores pre-stored data therein.

In response to user-input selection of the data input application, the data input system is programmed to implement a data input method for inputting data in an input field displayed on the display device. In the data input method, the processor of the input device is programmed to display a hotkey list including at least one hotkey that is associated with the pre-stored data, in response to a user-input interaction with the input device associated with the at least one hotkey, transmit the pre-stored data to the communication component, and in response to receipt of the pre-stored data from the input device, enter the pre-stored data in the input field.

According to another embodiment of the disclosure, the data input system includes an electronic device and an authentication device that is capable of communicating with the electronic device.

The electronic device includes a storage component, an input module, a display device for displaying an input field, and a processor. The storage component stores instructions to be executed by the processor that, in response to user-input selection, implements a data input method for entering data in the first input field. In the data input method, the processor is programmed to:

control the display device to display an authentication instruction instructing a user to input authentication data associated with an identity of the user;

in response to receipt of the authentication data inputted via the input module, compare the authentication data with user data pre-stored in the storage component;

when it is determined that the authentication data is identical with the user data, control the communication component to transmit an authorization request to the authentication device;

in response to an authorization from the authentication device, control the display device to display a hotkey list including at least one hotkey that is associated with first pre-stored data; and in response to a user-input interaction associated with the at least one hotkey, enter the first pre-stored data in the first input field.

BRIEF DESCRIPTION OF THE DRAWINGS

Other features and advantages of the disclosure will become apparent in the following detailed description of the embodiments with reference to the accompanying drawings, of which:

FIG. 7B is a flow chart illustrating steps of the data input method to be implemented using the data input system of FIG. 6, according to one embodiment of the disclosure;

DETAILED DESCRIPTION

Figure 1:
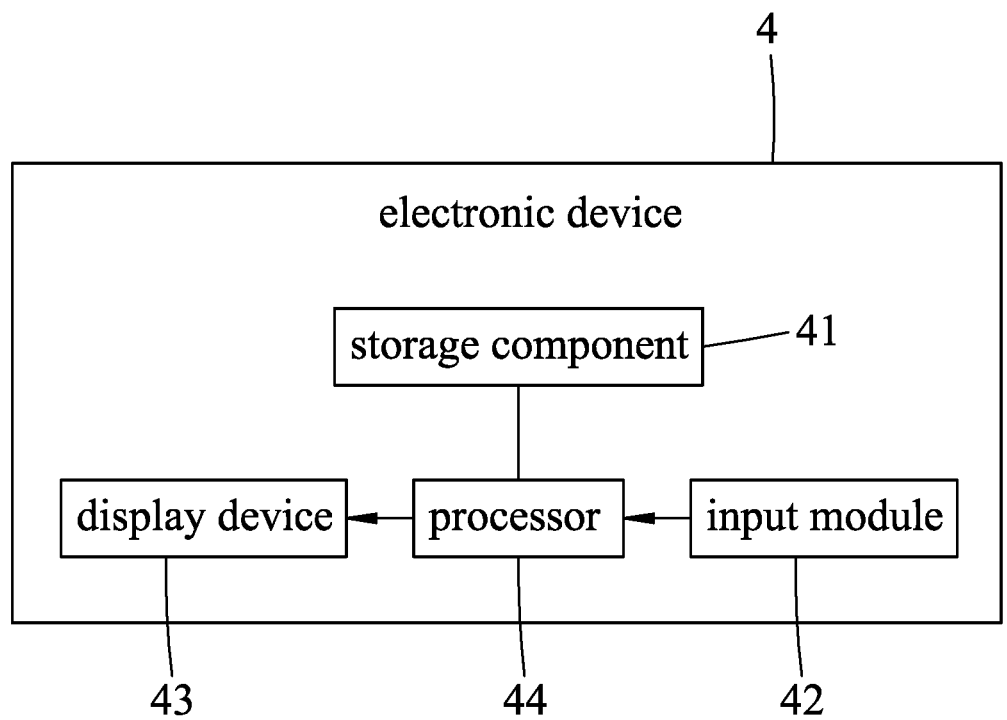
FIG. 1 is a block diagram illustrating an electronic device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating an electronic device 4 according to one embodiment of the disclosure. The electronic device 4 includes a storage component 41, an input module 42, a display device 43 and a processor 44.

In this embodiment, the electronic device 4 is embodied using a mobile phone. The storage component 41 may be embodied using a random access memory (RAM) such as a double data rate synchronous dynamic RAM, and stores a data input application therein. The data input application is to be executed by the processor 44, in response to user-input selection of the data input application, to implement a data input method for entering data.

The input module 42 enables a user to input data so as to interact with the electronic device 4. In this embodiment, the input module 42 and the display device 43 are embodied using a touch screen.

The processor 44 may be embodied using a central processing unit (CPU), and is coupled to the storage component 41, the input module 42 and the display device 43.

Figure 2:
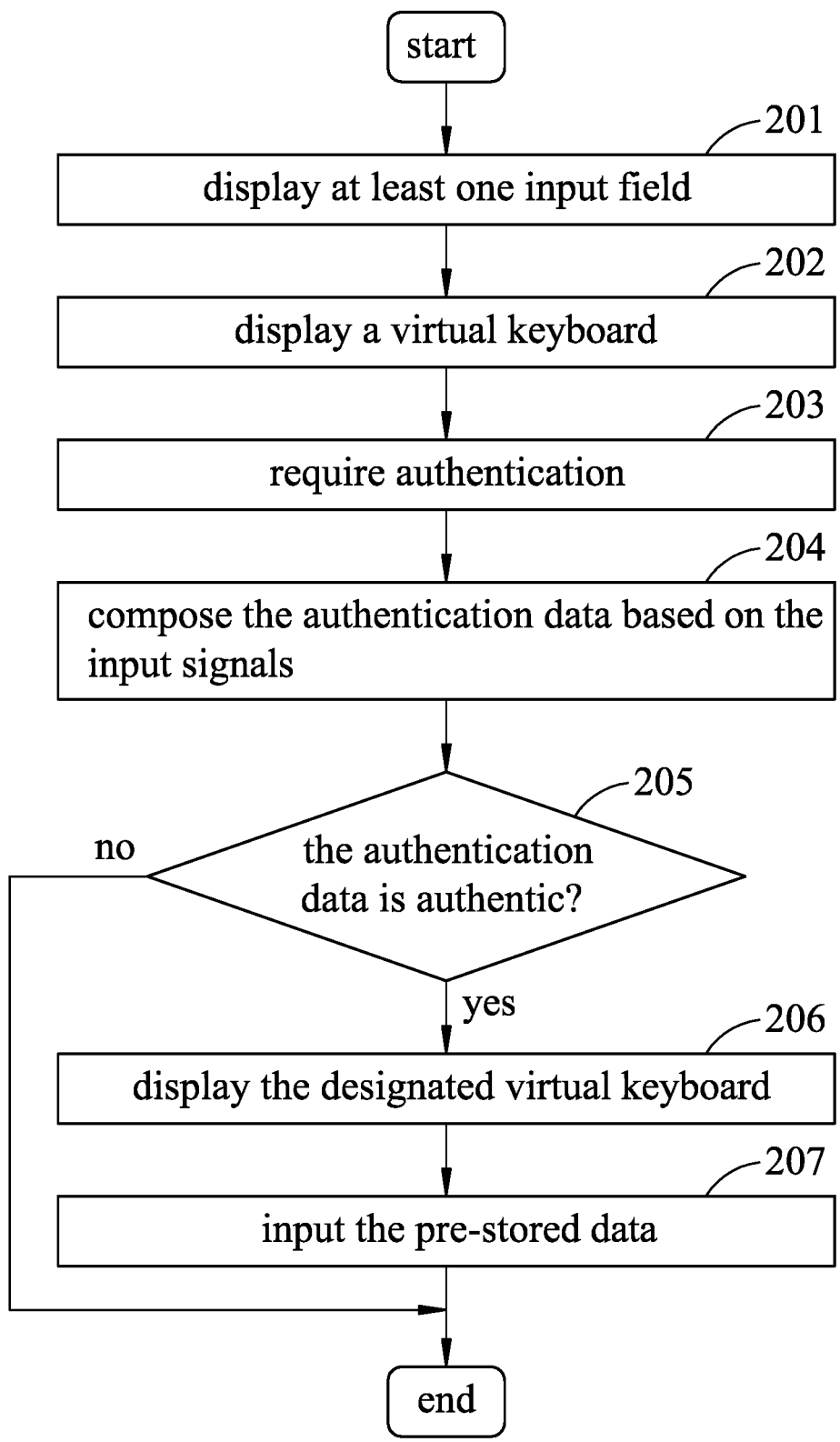
FIG. 2 is a flowchart illustrating steps of a data input method implemented by the electronic device, according to one embodiment of the disclosure.

FIG. 2 is a flow chart illustrating steps of the data input method implemented by the electronic device 4 according to one embodiment of the disclosure.

The data input method may be initiated by the user who intends to enter pre-stored data that is stored in the storage component 41 in an input field displayed on the display device 43. Specifically, the pre-stored data may be a string of characters and numbers that composes an ID, a password, etc.

In step 201, the processor 44 controls the display device 43 to display at least one input field. This action may be performed in response to the user operating the electronic device 4 to access a service that requires authentication using at least a password. For example, the user may attempt to login to a website using a web browser or an application. In one example illustrated in FIG. 3, the user activates a banking application that allows the user to access one or more bank accounts associated with him/her.

In response, the banking application may require the user to provide information associated with an identity of the user. In the example illustrated in FIG. 3, a national identification number, a username and a password are required to be inputted respectively in three input fields 61a, 61b and 61c. In this example, a previously inputted national identification number may be recorded by the choice of the user. If the user agrees to the recording, then in later use of the banking application, the national identification number will be automatically inputted. As a result, the user may be granted access by inputting only the username and the password.

In step 202, when the input module 42 detects a user-input interaction with one input field (for example, the input field 61b associated with the username), the processor 44 controls the display device 43 to display a virtual keyboard thereon for allowing the user to input data in the input field. For example, the user-input interaction may be done by the user touching the touch screen at a position corresponding to the input field. The virtual keyboard may be in a default layout such as one similar to QWERTY, and may include a virtual selection button allowing the user to select other available virtual keyboard(s).

It is noted that, prior to implementation of the data input method according to one embodiment of this disclosure, the user may operate the electronic device 4 to download the data input application that, when installed in the electronic device 4, registers a designated virtual keyboard in an operating system (OS) of the electronic device 4. As a result, the user is able to employ the designated virtual keyboard. When it is determined, based on user-input selection, that the user intends to invoke the data input application to use the designated virtual keyboard, the flow proceeds to step 203.

In step 203, the processor 44 requires authentication to verify the identity of the user. To this end, the storage component 41 may pre-store user data associated with the identity of the user, and the processor 44 controls the display device 43 to display an authentication instruction instructing a user to input authentication data associated with the identity of the user.

In step 204, in response to receipt of the authentication data in a form of a series of input signals from the input module 42, the processor 44 composes the authentication data based on the input signals.

In step 205, the processor 44 compares the authentication data with the user data pre-stored in the storage component 41, in order to determine whether the authentication data is authentic.

When it is determined that the authentication data is identical to the user data, the flow proceeds to step 206. Otherwise, the method is terminated.

In step 206, the processor 44 controls the display device 43 to display the designated virtual keyboard. Specifically, the designated virtual keyboard includes at least one hotkey that is associated with the pre-stored data.

Figure 4:
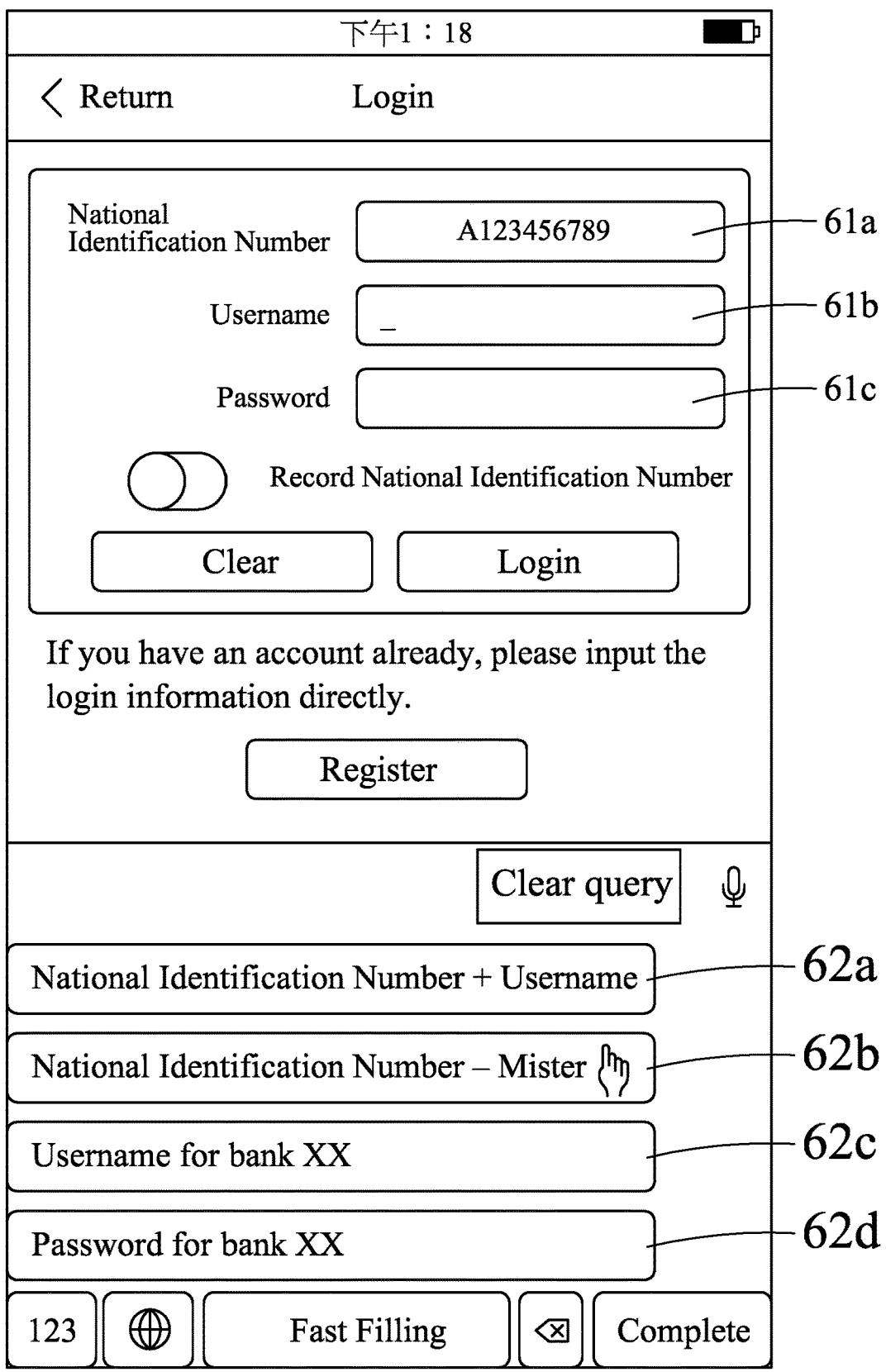
FIG. 4 illustrates a virtual keyboard for inputting data in the input fields.

In one example as illustrated in FIG. 4, the designated virtual keyboard includes at least four hotkeys 62a to 62d. Specifically, the hotkey 62c is associated with the username used in the banking application. It is noted that prior to executing the data input method, the user may invoke the data input application to create at least the hotkeys 62a to 62d, and to input the corresponding pre-stored data and associate the same with the hotkeys 62a to 62d. At the instant of performing step 206, the hotkeys 62a to 62d that have been created by the user are displayed.

Figure 5:
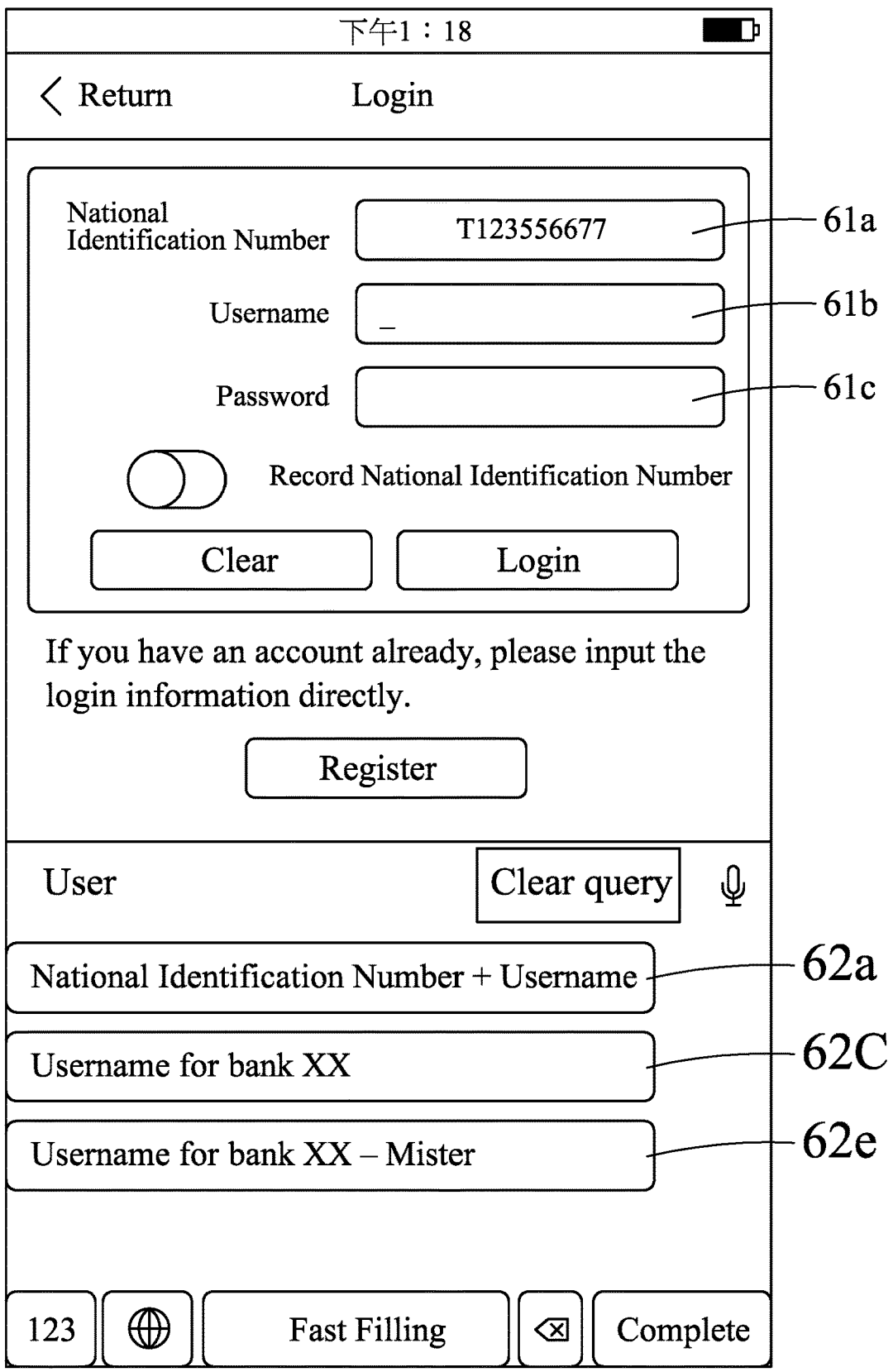
FIG. 5 illustrates a number of hotkeys.

In one example as illustrated in FIG. 5, when a plurality of hotkeys are available, the user may input an audio search query by operating an audio capturing module, such as a microphone, (not depicted in the drawings) that communicates with the processor 44. For example, the user may s the word "username" near the audio capturing module as an audio search query. In response to the audio search query, the processor 44 may select the hotkey(s) that corresponds with the audio search query for display. In the example of FIG. 5, only the hotkeys 62a, 62c and an additional hotkey 62e, which are associated with "username" are selected and displayed on the display device 43.

Afterward, the user may select a corresponding one of the hotkeys (e.g., 62c) via a user-input interaction (e.g., by tapping the display device 43 at a position where the hotkey 62c is displayed), and in step 207, the processor 44 inputs the pre-stored data (i.e., the username) in the input field 61b.

In one example, the pre-stored data may be encrypted. For example, the pre-stored data may be stored in a specific location of the storage component 41 (represented by a memory address), and the memory address is subjected to an encryption operation (e.g., using a hash function) to generate a key value, which serves as encrypted pre-stored data. When the encrypted pre-stored data is subjected to a decryption operation that involves a specific hash key, the memory address in which the pre-stored data is stored may be obtained.

The following Table 1 includes relations between hotkeys, the associated pre-stored data, exemplary memory locations, and the resulting key values.

TABLE 1

| Hotkey | Key Value | Pre-stored Data | Memory Address = (Key Value %0x1F) |
| --- | --- | --- | --- |
| National Identification Number | 0x4e2d570b4fe18a17 | T123556677 | 0x10 |
| Username for Bank XX | 0x4e2d5c0f4f019280 | Asd123 | 0x06 |
| Password for Bank XX | 0x6cf067099a635e33 | Zxc123 | 0x05 |

In use, when the user intends to enter data in the input field 61b associated with the username, in response to the user-input interaction of selection of the hotkey 62c which is associated with the user name, the processor 44 obtains the corresponding key value "0x4e2d5c0f4f019280" as the encrypted pre-stored data, performs the decryption operation to obtain the memory address (0x06) indicated by the encrypted pre-stored data. Then, the processor 44 reads the pre-stored data stored in the memory address (0x06), which is the string "Asd123", and enters the same in the input field 61b.

One effect of the above encryption configuration is that, once a hotkey is selected, the data that is immediately obtained by the processor 44 is the encrypted pre-stored data. As a result, even if the encrypted pre-stored data may be recorded by a malicious entity/software, the encrypted pre-stored data is not identical to the pre-stored data, and cannot be used for accessing the banking application.

It is noted that in cases where a plurality of input fields 61 are present, and the method is to be implemented multiple times (e.g., for the input fields 61a, 61b and 61c respectively), the operations for authentication may be performed only once. For example, when the method is completed for the input field 61a (i.e., the national identification number has been inputted) and the user subsequently selects the input field 61b, the flow may proceed directly to step 206 from step 202, skipping the operations for authentication (i.e., steps 203 to 205).

Figure 6:
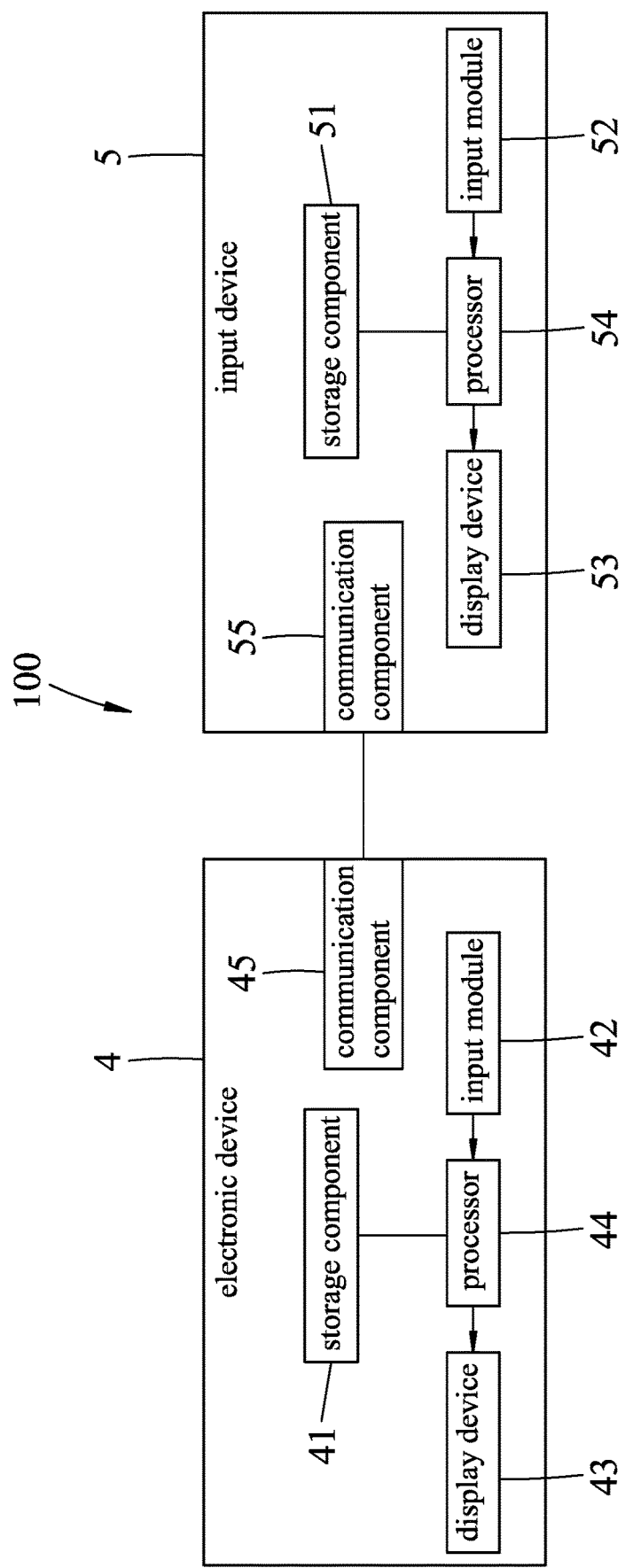
FIG. 6 is a block diagram illustrating a data input system according to one embodiment of the disclosure.

FIG. 6 is a block diagram illustrating a data input system 100 according to one embodiment of the disclosure. The data input system 100 includes the electronic device 4 and an input device 5.

The electronic device 4 in this embodiment further includes a communication component 45 for communicating with other electronic devices. The input device 5 includes a storage component 51, an input module 52, a display device 53, a processor 54 and a communication component 55. The storage component 51 may be a RAM, the input module 52 and the display device 53 may be implemented by a touch screen, the processor 54 may be a CPU. The electronic device 4 and the input device 5 may communicate with each other through the communication components 45 and 55 using a wired connection or a wireless connection (e.g., Bluetooth®).

It is noted that, in this embodiment, the pre-stored data is to be stored in the input device 5 instead of the electronic device 4. As a result, in order to implement the data input method, the electronic device 4 is first controlled to be communicating with the input device 5 via the communication components 45 and 55 in order to properly set up the input device 5.

Figure 7A:
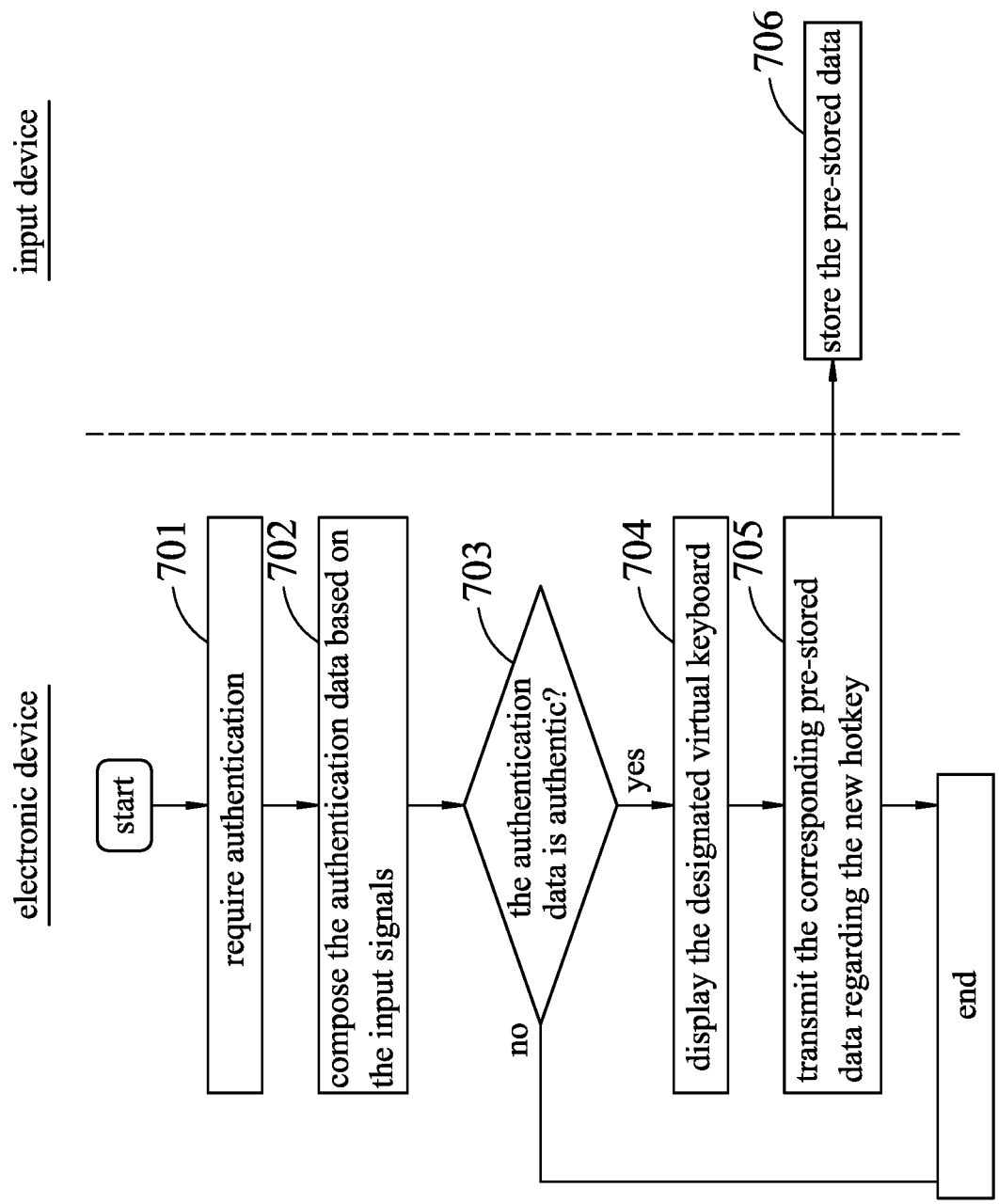
FIG. 7A is a flow chart illustrating steps of a setup process for enabling the data input system to implement the data input method, according to one embodiment of the disclosure.

FIG. 7A is a flow chart illustrating steps of a setup process in order to enable the data input system 100 to implement the data input method, according to one embodiment of the disclosure.

In this embodiment, in response to a user-input setup request received from the input module 42, the processor 44 may first require authentication to verify the identity of the user in step 701.

In this embodiment, steps 701 to 703 are implemented in manners similar to those of steps 203 to 205 (see FIG. 2), respectively. That is to say, when it is determined in step 703 that the authentication data inputted in step 702 is identical to the user data, the flow proceeds to step 704. Otherwise, the method is terminated.

In step 704, the processor 44 controls the display device 43 to display the designated virtual keyboard including a "create" option key that enables the user to create a new hotkey and to associate the new hotkey with new pre-stored data.

The user is then instructed to create a new hotkey. When the input module 42 detects user-input interaction with the "create" option key, the processor 44 may control the display device 43 to display an input dialog box for user input of a designated name for the new hotkey and corresponding pre-stored data in the form of a string. In response to the user input of the corresponding pre-stored data, in step 705, the processor 44 controls the communication component 45 to transmit, to the input device 5, the corresponding pre-stored data for the new hotkey and association data indicating association of the corresponding pre-stored data with the new hotkey.

In step 706, the communication component 55 receives the data from the communication component 45, and in turn, the processor 54 stores the association data and the corresponding pre-stored data in the storage component 51. Namely, the new hotkey is successfully set up after steps 705 and 706.

It is noted that steps 705 and 706 may be repeated to set up a plurality of new hotkeys, or to modify the corresponding pre-stored data for an existing hotkey that has already been set up.

Specifically, the display device 43 of the electronic device 4 may display the existing hotkeys so as to allow the user to modify the corresponding pre-stored data for the existing hotkeys or to add new corresponding data for one of the existing hotkeys when said one of the existing hotkeys has not been associated with any corresponding data yet. In response to the user-input interaction associated with a selected one of the hotkeys, the processor 44 controls the communication component 45 to transmit to the input device 5 a new word string (provided by the user) that is to be associated with the selected one of the hotkeys. In receipt of the new word string, the input device 5 may associate the new word strings to the selected one of the hotkeys.

Afterwards, the data input system 100 may be ready to implement the data input method.

FIG. 7B is a flow chart illustrating steps of a data input method to be implemented using the data input system 100 of FIG. 6, according to one embodiment of the disclosure.

In step 707, the processor 54 of the input device 5 controls the display device 53 to display a virtual keyboard. The virtual keyboard includes one or more hotkeys that have the corresponding pre-stored data stored in the storage component 51. It is noted that, in cases that a plurality of hotkeys are available, the virtual keyboard may be displayed in the form of a dynamic virtual keyboard layout.

Figure 3:
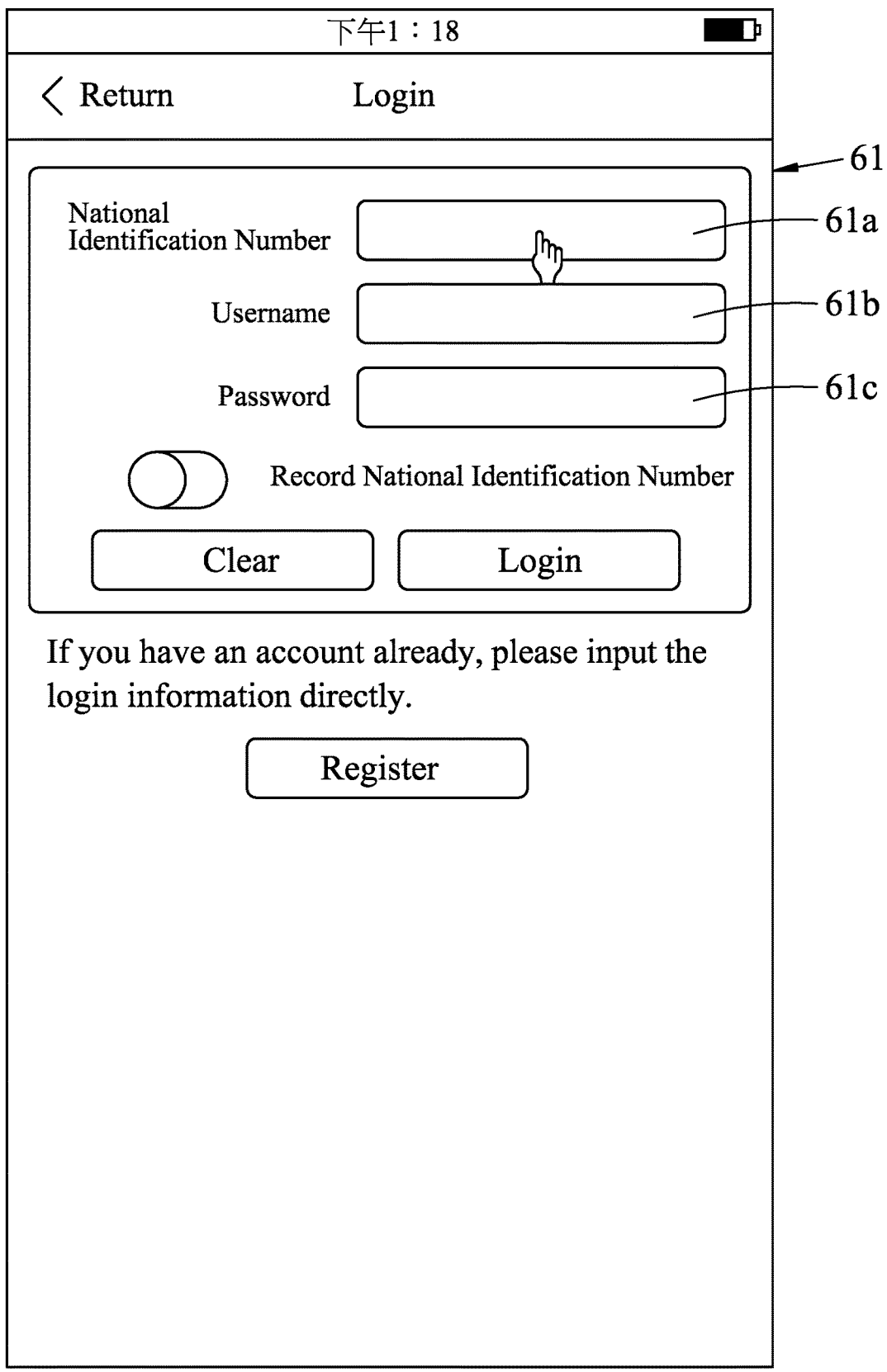
FIG. 3 illustrates a screen of an application, including a number of input fields.

In step 708, the processor 44 of the electronic device 4 controls the display device 43 to display at least one input field 61 (see FIG. 3) (e.g., the input fields 61a to 61c as shown in FIGS. 3 to 5).

In step 709, when the input module 42 detects user-input interaction with one of the input fields 61, the processor 44 controls the communication component 45 to communicate with the input device 5 to inform the processor 54 of the input device 5 of the user-input interaction.

In response, in step 710, the processor 54 controls the display device 53 to display an instruction for the user to select one of the hotkeys displayed on the virtual keyboard using the input module 52.

Then, in step 711, after the input module 52 detects user-input interaction with one of the hotkeys, the processor 54 controls the communication component 55 to transmit the corresponding pre-stored data associated with the one of the hotkeys to the electronic device 4. In turn, in step 712, the processor 44 inputs the pre-stored data thus received in the selected one of the input fields 61. One effect of the above mentioned embodiment is that by employing the input device 5 to store the pre-stored data and to receive the user-input interaction with the hotkeys, a malicious software, despite being planted in the electronic device 4, is unable to obtain the pre-stored data since the data and operations are performed outside of the electronic device 4.

Figure 8:
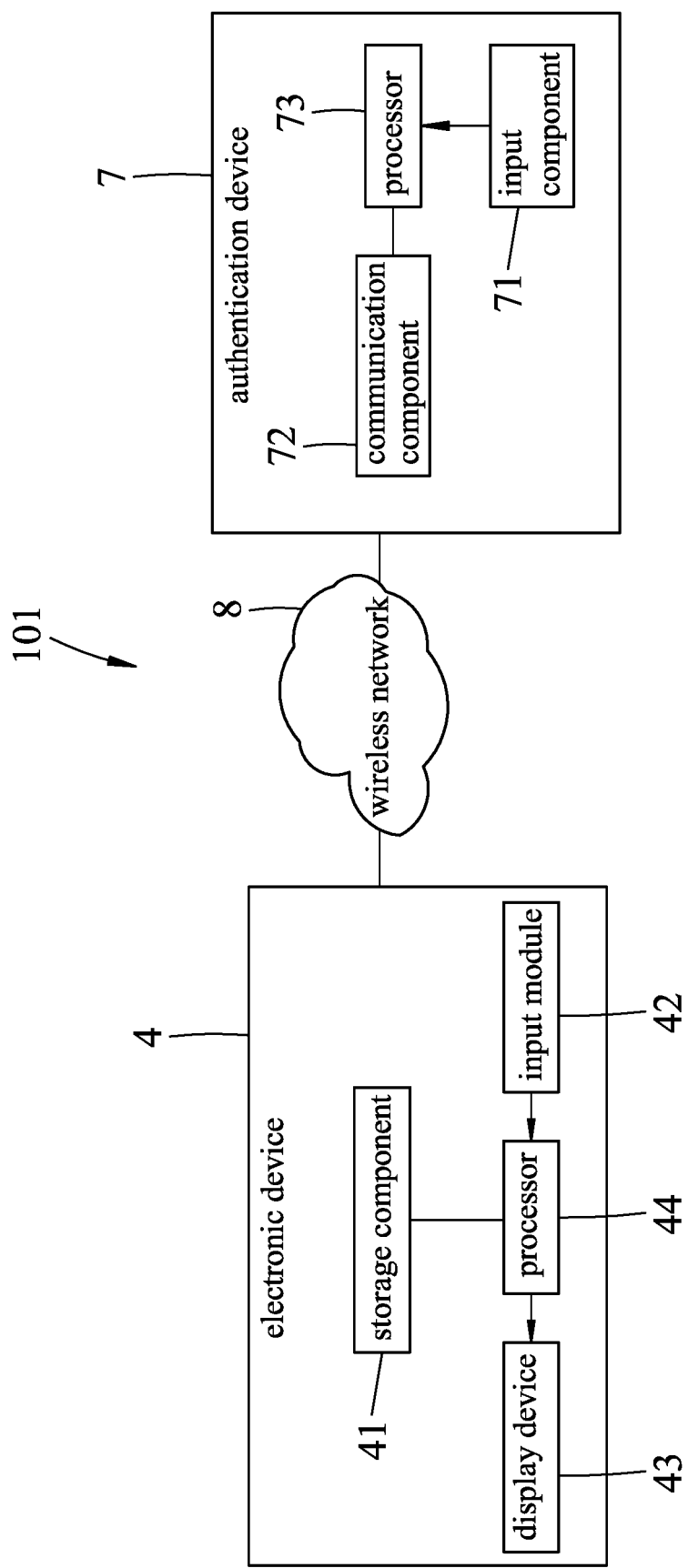
FIG. 8 is a block diagram illustrating a data input system according to one embodiment of the disclosure.

FIG. 8 is a block diagram illustrating a data input system 101 according to one embodiment of the disclosure. The data input system 101 includes the electronic device 4 and an authentication device 7.

The authentication device 7 in this embodiment may be an electronic device that is associated with the user and that stores information uniquely associated with the identity of the user, such as a certificate authority (CA), and includes an input component 71 (e.g., buttons), a communication component 72 (e.g., a wireless communication component), and a processor 73 coupled to the input component 71 and the communication component 72.

The electronic device 4 and the authentication device 7 may be able to communicate with each other via a wireless network 8 (such as a Wi-Fi communication, Bluetooth® connection, etc.).

Figure 9:
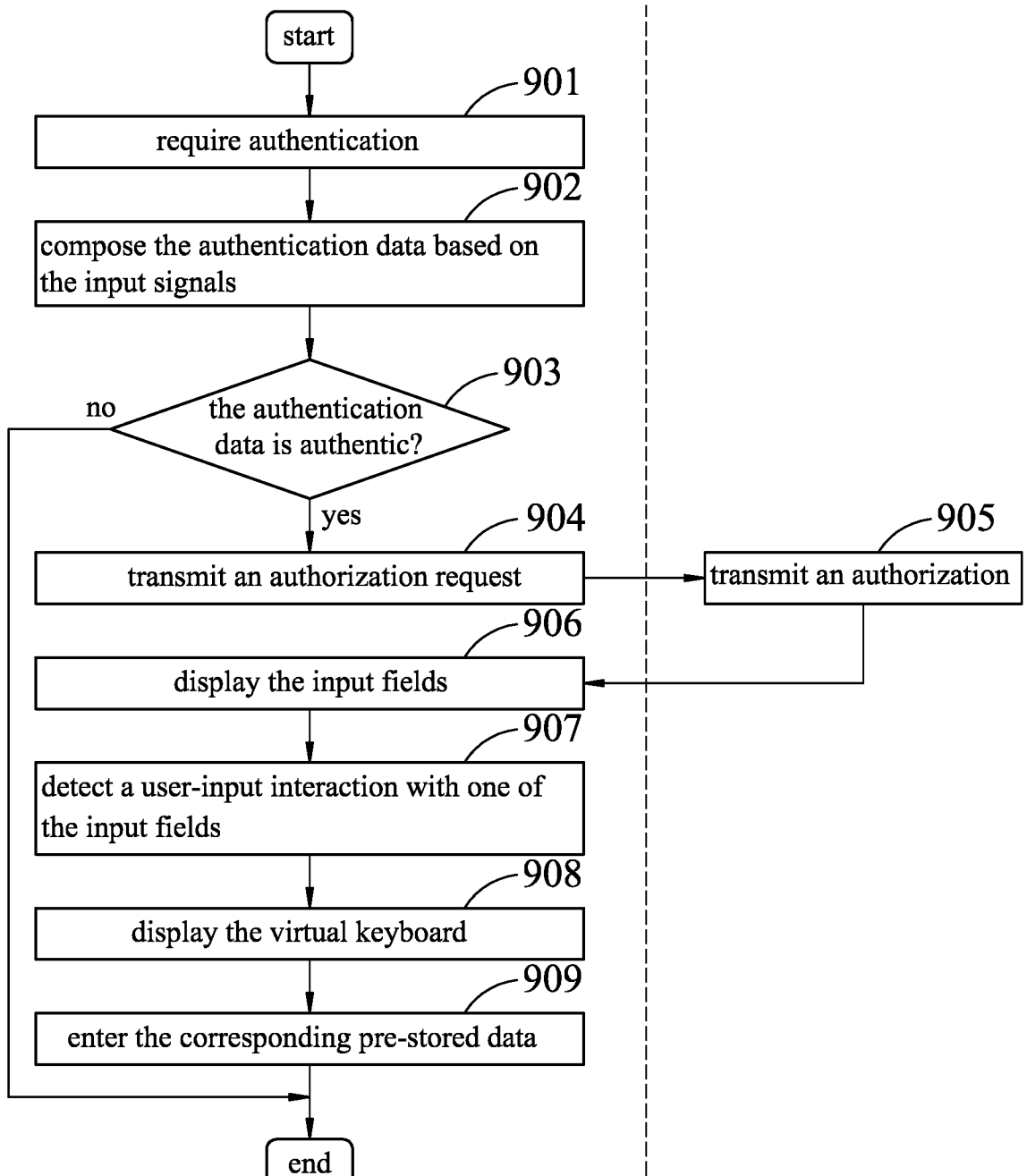
FIG. 9 is a flowchart illustrating steps of a data input method to be implemented by the data input system shown in FIG. 8, according to one embodiment of the disclosure.

FIG. 9 is a flow chart illustrating steps of a data input method to be implemented by the data input system 101 shown in FIG. 8, according to one embodiment of the disclosure.

In this embodiment, in response to user-input selection of the data input application from the input module 42 of the electronic device 4, the processor 44 may first require authentication to verify the identity of the user.

As a result, steps 901 to 903 are implemented in manners similar to those of steps 203 to 205 (see FIG. 2), respectively. That is to say, when it is determined in step 903 that the authentication data inputted in step 902 is identical to the user data, the flow proceeds to step 904. Otherwise, the method is terminated.

In step 904, the processor 44 controls the communication component 45 to transmit an authorization request to the authentication device 7. The processor 44 may further control the display device 43 to display a notification to instruct the user to operate the authentication device 7 for providing further authentication.

In turn, the user is required to provide a specific input using the input component 71 of the authentication device 7 (e.g., inputting a password using the buttons). In response to the specific input interaction, in step 905, the processor 73 transmits an authorization to the electronic device 4, indicating that the user is in possession of the authentication device 7. Accordingly, the data input application can be executed in the following steps.

In step 906, the processor 44 executes the banking application, and controls the display device 43 to display the input fields 61 (see FIG. 3).

When the input module 42 detects user-input interaction with one of the input fields 61 in step 907, the processor 44 controls the display device 43 to display the virtual keyboard thereon that includes the hotkey list in step 908.

Then, in step 909, in response to user-input interaction associated with one of the hotkeys in the hotkey list, the processor 44 enters the corresponding pre-stored data in the input field 61.

One effect of the above embodiment is that the data input method requires the user to have possession of the authentication device 7 in order to be implemented. As a result, when the electronic device 4 becomes lost, a third party recovering the electronic device 4 cannot proceed to implement the data input method without the authentication device 7.

In some embodiments, the input device 5 and the authentication device 7 may both be incorporated in a single data input system. In this configuration, the pre-stored data is stored in the input device 5, and the authentication device 7 is used for providing the authentication as described in step 905.

It is noted that the data input method may be incompatible or partly incompatible with some applications or websites. Specifically, some applications or websites may only permit the default virtual keyboard to be used for some (e.g., one associated with the password), but not all of the input fields.

Figure 10:
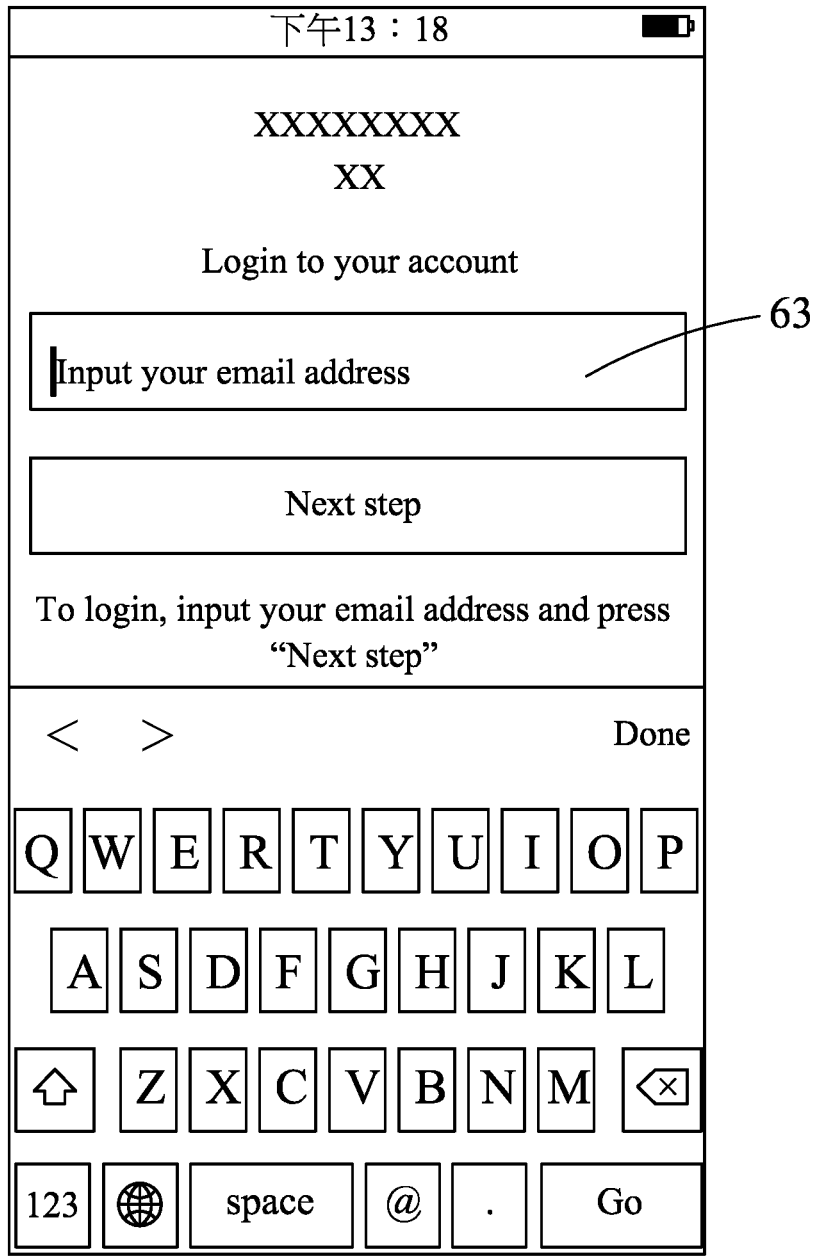
FIG. 10 illustrates a first screen of an application instructing the user to input a username.
Figure 11:
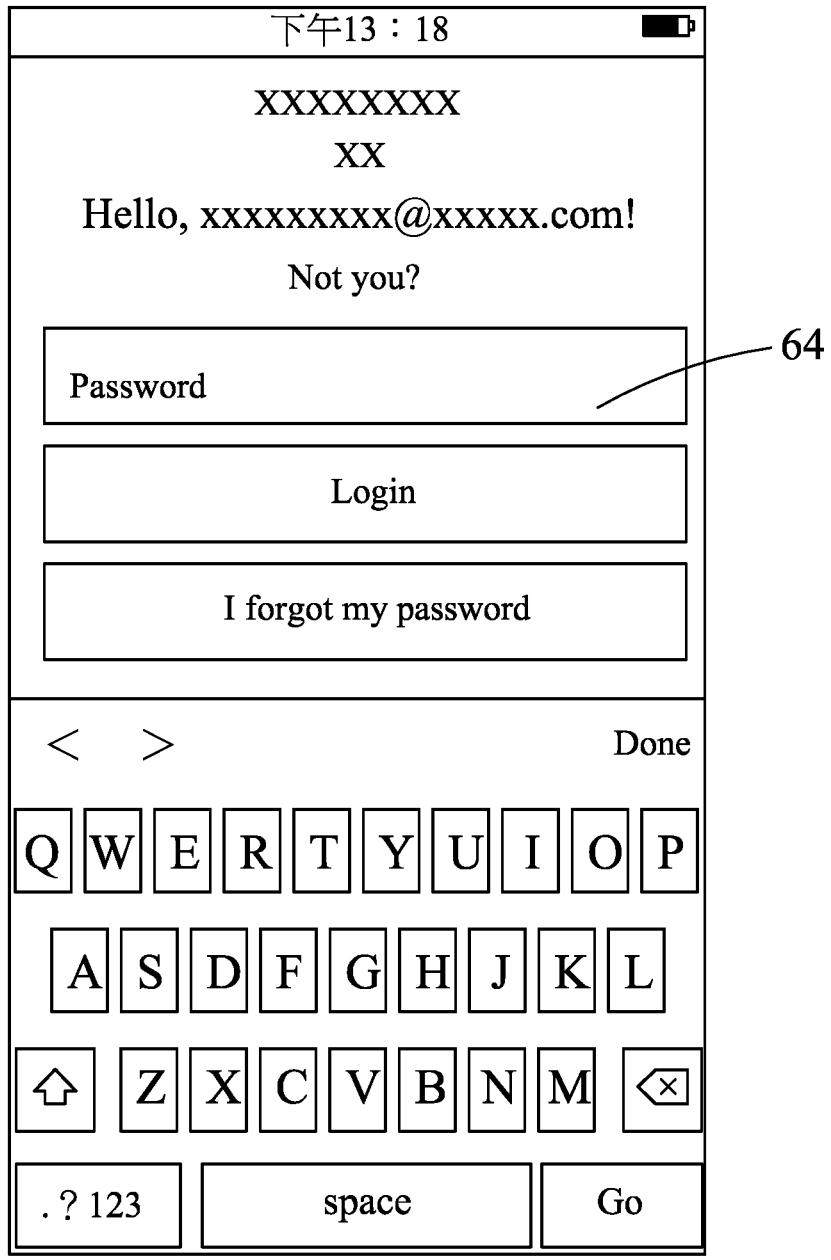
FIG. 11 illustrates a second screen of an application instructing the user to input a password.

In one example as shown in FIG. 10, logging in an application (e.g., an email platform) first requires the user to input the username (which is in the form of an email address) in the first input field 63 of a first screen. In this screen, the user is allowed to switch to other virtual keyboard layouts (by touching the globe button). After inputting the username, the user is directed to a second screen as shown in FIG. 11, and is instructed to input the password in a second input field 64 of the second screen. In this screen, the feature for selecting other virtual keyboards is disabled, preventing the data input method as described above from being implemented.

In order to address this issue, a composite hotkey may be created to be associated with both first pre-stored data (e.g., a username) and second pre-stored data (e.g., a password). One example of the composite hotkey is illustrated by the hotkey 62a in FIG. 4, which is associated with national identification number and username. In use, when the user is interacting with the screen of FIG. 10, he/she may switch to the designated virtual keyboard and select the composite hotkey by a first user-input interaction. In response, the processor 44 first enters the first pre-stored data in the first input field 63 in the screen, and records the second pre-stored data in, for example, a clipboard for subsequent use.

Afterward, when the user is directed to the screen of FIG. 11, and is not allowed to use the designated virtual keyboard, he/she may input a second user-input interaction associated with the second input field 64. In response to the second user-input interaction, the processor 44 enters the second pre-stored data in the second input field 64. Specifically, the second user-input interaction may be a paste command for pasting the second pre-stored data in the second input field 64.

It should be apparent for one skilled in the art to incorporate the feature of the composite hotkey in any one of the above mentioned embodiments.

To sum up, embodiments of the disclosure provide data input methods and data input systems that enable the user to create a hotkey list associated with various information, which the user may be required to input on different occasions. For example, the hotkey list may include hotkeys for different sets of username and password, thereby eliminating the need to memorize every set of username and password. Additionally, by utilizing the encrypting mechanism, the input device 5 and/or the authentication device 7 in implementing the data input method, enhanced security may be achieved as a malicious software is unable to easily obtain the pre-stored data by simply recording the activity of the input module 42. Similarly, a third party getting hold of the electronic device 4 without also having the input device 5 and/or the authentication device 7 is also unable to obtain the pre-stored data.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A data input method to be implemented by an electronic device that includes a storage component, a display device and a processor, the storage component storing a data input application to be executed by the processor, in response to user-input selection of the data input application, to implement the data input method for entering data in a first input field displayed on the display device, the data input method comprising:

controlling, by the processor, the display device to display an authentication instruction instructing a user to input authentication data associated with an identity of the user;

in response to receipt of the authentication data inputted via an input module of the electronic device, comparing, by the processor, the authentication data with user data pre-stored in the storage component;

when it is determined that the authentication data is identical with the user data, controlling, by the processor, the display device to display at least one hotkey that is associated with first pre-stored data; and in response to a first user-input interaction associated with the at least one hotkey, entering, by the processor, the first pre-stored data in the first input field;

wherein the first pre-stored data is encrypted using a hash function, and wherein the data input method further comprises, prior to entering the first pre-stored data, decrypting the first pre-stored data, and the decrypting of the first pre-stored data is executed using a hash key.

2. The data input method of claim 1, the at least one hotkey being further associated with second pre-stored data, the method further comprising:

after the entering of the first pre-stored data, in response to a second user-input interaction associated with a second input field displayed by the display device, entering, by the processor, the second pre-stored data in the second input field.

3. The data input method of claim 2, further comprising, in response to the first user-input interaction associated with the at least one hotkey, copying the second pre-stored data;

wherein the second user-input interaction is a paste command for pasting the second pre-stored data in the second input field.

4. A data input method to be implemented by an electronic device communicating with an input device that stores pre-stored data therein, the electronic device including a storage component, a display device, a processor and a communication component, the storage component storing a data input application to be executed by the processor, in response to user-input selection of the data input application, to implement the data input method for entering data in an input field displayed on the display device, the data input method comprising:

displaying, by the input device, a hotkey list including at least one hotkey that is associated with the pre-stored data;

in response to user-input interaction associated with the at least one hotkey, transmitting, by the input device, the pre-stored data to the communication component; and in response to receipt of the pre-stored data from the input device, entering, by the processor, the pre-stored data in the input field;

wherein the pre-stored data includes a plurality of word strings;

wherein the hotkey list displayed by the input device includes a plurality of hotkeys associated with the word strings of the pre-stored data, respectively; and wherein the method further comprises, prior to displaying the hot key list:

displaying, by the electronic device, the hotkeys so as to allow modification;

in response to the user-input interaction associated with a selected one of the hotkeys, controlling, by the processor, the communication component to transmit to the input device a new word string that is to be associated with the selected one of the hotkeys; and in receipt of the new word string from the electronic device, associating, by the input device, the new word string to the selected one of the hotkeys.

5. The data input method of claim 4, wherein the displaying the hotkey list by the input device includes displaying, by the input device, the hotkey list in the form of a dynamic virtual keyboard layout.

6. The data input method of claim 4, the pre-stored data including at least one word string, the data input method further comprising, prior to displaying the hotkey list by the input device:

in response to a user-input setup request from an input module of the electronic device, controlling, by the processor, the display device to display an authentication request instructing a user to input authentication data associated with an identity of the user;

in response to receipt of the authentication data inputted via the input module, comparing, by the processor, the authentication data with user data pre-stored in the storage component;

when it is determined that the authentication data is identical with the user data, controlling, by the processor, the display device to display the hotkey list;

in response to user-input selection of the at least one hotkey, controlling, by the processor, the communication component to transmit the word string of the pre-stored data that is associated with the one of the hotkeys to the input device to be stored as the pre-stored data.

7. A data input system comprising:

an electronic device including
  a display device,
  a storage component storing a data input application, and
  a processor for executing, in response to user-input selection of the data input application, the data input application to implement a data input method for entering data in an input field displayed on said display device; and an input device including
  a storage component storing pre-stored data therein,
  a display device for displaying a hotkey list including at least one hotkey that is associated with the pre-stored data,
  an input module for detecting user-input interaction with the at least one hotkey,
  a communication component for communicating with said electronic device, and
  a processor programmed to control said display device to display the hotkey list, and to control said communication component to transmit the pre-stored data to said electronic device in response to detection of the user-input interaction with the at least one hotkey by said input module, wherein said processor of said electronic device is programmed, when executing the data input application to implement the data input method, to enter the pre-stored data in the input field in response to receipt of the pre-stored data from said input device, wherein:
  the pre-stored data stored in said storage component includes a plurality of word strings, and the hotkey list displayed by said display device of said input device includes a plurality of hotkeys associated with the word strings of the pre-stored data, respectively;
  prior to displaying the hot key list, said processor of said electronic device is programmed to control said display device to display the hotkeys so as to allow modification, and in response to the user-input interaction associated with a selected one of the hotkeys, controlling said communication component to transmit to said input device a new word string that is to be associated with the selected one of the hotkeys; and in receipt of the new word string from said electronic device, said input device associates the new word string to the selected one of the hotkeys.

8. The data input system of claim 7, wherein said display device of said input device displays the hotkey list in the form of a dynamic virtual keyboard layout.

9. The data input system of claim 7, the pre-stored data including at least one word string, wherein said electronic device further includes an input module enabling the user to input data, wherein, prior to displaying the hotkey list, said processor is further programmed, when executing the data input application to implement the data input method, to in response to a user-input setup request received from said input module of said electronic device, control said display device of said electronic device to display an authentication request instructing a user to input authentication data associated with an identity of the user, in response to receipt of the authentication data inputted via said input module of said electronic device, compare the authentication data with user data pre-stored in said storage component of said electronic device, when it is determined that the authentication data is identical with the user data, control said display device of said electronic device to display the hotkey list, and in response to user-input selection of the at least one hotkey, control the communication component to transmit the at least one word string of the pre-stored data that is associated with the one of the hotkeys to the input device to be stored as the pre-stored data.

10. A data input method to be implemented by an electronic device communicating with an authentication device, the electronic device including a storage component, an input module, a display device, a processor and a communication component, the storage component storing a data input application to be executed by the processor, in response to user-input selection of the data input application, to implement the data input method for entering data in a first input field displayed on the display device, the data input method comprising:

controlling, by the processor, the display device to display an authentication instruction instructing a user to input authentication data associated with an identity of the user;

in response to receipt of the authentication data inputted via the input module, comparing, by the processor, the authentication data with user data pre-stored in the storage component;

when it is determined that the authentication data is identical with the user data, controlling, by the processor, the communication component to transmit an authorization request to the authentication device;

in response to an authorization from the authentication device, controlling, by the processor, the display device to display a hotkey list including at least one hotkey that is associated with first pre-stored data; and in response to a first user-input interaction associated with the at least one hotkey, entering, by the processor, the first pre-stored data in the first input field, wherein the first pre-stored data is encrypted using a hush function, and wherein the data input method further comprises, prior to entering the first pre-stored data, decrypting the first pre-stored data, and the decrypting of the first pre-stored data is executed using a hash key.

11. The data input method of claim 10, the at least one hotkey being further associated with second pre-stored data, the method further comprising:

after the entering of the first pre-stored data, in response to a second user-input interaction associated with a second input field displayed by the display device, entering, by the processor, the second pre-stored data in the second input field.

12. The data input method of claim 11, further comprising, in response to the first user-input interaction associated with the at least one hotkey, copying the second pre-stored data;

wherein the second user-input interaction is a paste command for pasting the second pre-stored data in the second input field.

13. A data input system comprising:

an electronic device including a storage component, an input module, a display device and a processor, and an authentication device that is communicating with said electronic device;

wherein said storage component stores a data input application to be executed by said processor, in response to user-input selection of the data input application, to implement a data input method for entering data in a first input field displayed on said display device, and in the data input method, said processor is programmed to control said display device to display an authentication instruction instructing a user to input authentication data associated with an identity of the user, in response to receipt of the authentication data inputted via said input module, compare the authentication data with user data pre-stored in said storage component, when it is determined that the authentication data is identical with the user data, control said communication component to transmit an authorization request to said authentication device, in response to an authorization from said authentication device, control said display device to display a hotkey list including at least one hotkey that is associated with first pre-stored data, and in response to a first user-input interaction associated with the at least one hotkey, entering the first pre-stored data in the first input field, wherein the first pre-stored data stored in said storage component includes a plurality of word strings, and the hotkey list displayed by said display device of said input device includes a plurality of hotkeys associated with the word strings of the first pre-stored data, respectively;

prior to displaying the hot key list, said processor of said electronic device is programmed to control said display device to display the hotkeys so as to allow modification, and in response to the user-input interaction associated with a selected one of the hotkeys, controlling said communication component to transmit to said input device a new word string that is to be associated with the selected one of the hotkeys; and in receipt of the new word string from said electronic device, said input device associates the new word string to the selected one of the hotkeys.

14. The data input system of claim 13, the at least one hotkey being further associated with second pre-stored data, wherein, in the data input method, said processor is further programmed to:

after the entering of the first pre-stored data, in response to a second user-input interaction associated with a second input field displayed by the display device, enter the second pre-stored data in the second input field.

15. The data input system of claim 14, wherein, in the data input method, said processor is further programmed to, in response to the first user-input interaction associated with the at least one hotkey, copy the second pre-stored data;

wherein the second user-input interaction is a paste command for pasting the second pre-stored data in the second input field.

* * * * *